US011971161B2

(12) United States Patent
Damhaut

(10) Patent No.: US 11,971,161 B2
(45) Date of Patent: Apr. 30, 2024

(54) COMPACT LUMINAIRE HEAD

(71) Applicant: Schreder S.A., Brussels (BE)

(72) Inventor: Luc Damhaut, Brussels (BE)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 17/805,142

(22) Filed: Jun. 2, 2022

(65) Prior Publication Data

US 2022/0290852 A1 Sep. 15, 2022

Related U.S. Application Data

(63) Continuation of application No. 15/733,740, filed as application No. PCT/EP2019/059137 on Apr. 10, 2019, now Pat. No. 11,365,876.

(51) Int. Cl.

| | |
|---|---|
| ***F21V 29/74*** | (2015.01) |
| ***F21V 3/02*** | (2006.01) |
| ***F21V 19/00*** | (2006.01) |
| *F21W 131/103* | (2006.01) |

(52) U.S. Cl.

CPC .............. *F21V 29/745* (2015.01); *F21V 3/02* (2013.01); *F21V 19/0035* (2013.01); *F21V 19/0085* (2013.01); *F21W 2131/103* (2013.01)

(58) Field of Classification Search

CPC .................... F21V 29/74–78; F21W 2131/103

See application file for complete search history.

(56) References Cited

U.S. PATENT DOCUMENTS

| | | | | |
|---|---|---|---|---|
| 8,585,244 | B1 | 11/2013 | Liu et al. | |
| 2010/0226138 | A1 | 9/2010 | Lin et al. | |
| 2012/0002413 | A1 | 1/2012 | Kim et al. | |
| 2012/0106152 | A1 | 5/2012 | Zheng et al. | |
| 2013/0088881 | A1* | 4/2013 | Wu | F21V 15/01 362/373 |
| 2013/0322077 | A1 | 12/2013 | Liu et al. | |

(Continued)

FOREIGN PATENT DOCUMENTS

| | | |
|---|---|---|
| CN | 101699139 A | 4/2010 |
| CN | 101929642 B | 4/2013 |

OTHER PUBLICATIONS

PCT International Search Report and Written Opinion, PCT International Application No. PCT/EP2019/059137, dated May 7, 2019.

*Primary Examiner* — Sean P Gramling

(74) *Attorney, Agent, or Firm* — McDonnell Boehnen Hulbert & Berghoff LLP

(57) ABSTRACT

Example embodiments relate to compact luminaire heads. One example luminaire head includes a thermally conductive metal body that includes a plate-like portion, a tube portion, and at least one cooling fin. The plate-like portion extends in a longitudinal direction of the metal body and having a flat first surface and a second surface opposite the first surface. The tube portion extends in the longitudinal direction at the second surface. The at least one cooling fin extends away from the second surface adjacent to the tube portion. The luminaire head also includes at least one support substrate with a plurality of light emitting elements. The at least one support substrate is arranged against the first surface. The tube portion is shaped to receive in a first open end thereof a rigid cylindrical end portion of a mounting base, such as a pole for the luminaire head.

13 Claims, 4 Drawing Sheets

(56) References Cited

U.S. PATENT DOCUMENTS

| | | | | |
|---|---|---|---|---|
| 2013/0322096 | A1* | 12/2013 | Liu | F21V 21/088 362/382 |
| 2016/0053952 | A1 | 2/2016 | Kuti et al. | |

* cited by examiner

COMPACT LUMINAIRE HEAD

CROSS-REFERENCE TO RELATED APPLICATIONS

The present application is a continuation of U.S. application Ser. No. 15/733,740, filed Oct. 9, 2020; which is a national stage entry of PCT/EP2019/059137 filed Apr. 10, 2019; which claims priority to BE 2018/5239 filed Apr. 10, 2018. The contents of each of which are hereby incorporated by reference.

FIELD OF INVENTION

The field of the invention relates to a luminaire head, such as a luminaire head for a lamp post, and in particular an outdoor luminaire head.

BACKGROUND

Existing luminaire heads are usually quite complex and involve the use of a large number of components which have to be assembled. This makes the production of luminaire heads expensive.

SUMMARY

The object of embodiments of the invention is to provide a simple, robust, low cost modular luminaire head with a limited number of components. Preferably, the luminaire head should be easy and quick to assemble and provide for a simple pole fixation.

According to a first aspect of the invention there is provided a luminaire head comprising a thermally conductive metal body and at least one support substrate with a plurality of light emitting elements. The thermally conductive metal body comprises a plate like portion, a tube portion and at least one cooling tin. The plate like portion extends in a longitudinal direction of the metal body and has a flat first surface and a second surface opposite said first surface. The tube portion extends in said longitudinal direction at the second surface. The at least one cooling fin extends away from the second surface adjacent to the tube portion, i.e. upwardly from the second surface, when looking in a direction away from the second surface. The at least one support substrate is arranged against the first surface, at least in an area opposite the tube portion. The tube portion is shaped to receive in a first open end thereof a rigid cylindrical end portion of a mounting base, such as a pole for the luminaire head. The tube portion is provided with at least one hole for receiving a fixation means to fix the tube portion to the cylindrical end portion of the mounting base.

Such a luminaire head has the advantage that the metal body of the luminaire head functions as heatsink, as pole fixation, and as mounting means for the light emitting elements. Such metal bodies can be easily produced in large quantities with a low level of investment. Also such metal bodies make the luminaire head modular: the metal body can be produced as a long body which is cut at the required length depending on the required use. Also, the luminaire head is quick and easy to assemble as only little components are involved.

Preferably, the at least one support substrate extends over a width perpendicular to the longitudinal direction which is at least 80%, preferably at least 90% of the width of the plate like portion. The at least one support substrate may then comprise a first and at least a second support substrate arranged next to each other, seen in the longitudinal direction. In other embodiments the width perpendicular to the longitudinal direction may be less than 50% of the width of the plate like portion. In that case, the at least one support substrate may comprise a first and at least a second support substrate arranged next to each other, seen in the width direction. In both embodiments, heat can be easily transported from the support assemblies to the metal body and in particular to the one or more cooling fins of the metal body.

In a preferred embodiment, the flat first surface extends over a length in the longitudinal direction of the metal body, and the tube portion extends over substantially the same length in said longitudinal direction. More preferably, the metal body is an extruded body extruded in one piece in the longitudinal direction, preferably an extruded body extruded from aluminium. In that manner the production cost can be low, whilst providing good heat conduction. Typically the plate like portion extends over the same length in the longitudinal direction.

In a preferred embodiment, the tube portion extends substantially in the middle of the second surface of the plate like portion. In that manner the luminaire head can be well balanced and more or less symmetrically arranged with respect to the mounting base.

In a preferred embodiment, the width of the plate like portion, seen in a width direction perpendicular to the longitudinal direction, is at least 50% larger than a maximum width of the tube portion, preferably at least twice the width of the tube portion. In that manner sufficient mounting surface area is provided through the first surface, and there is sufficient surface area adjacent the tube portion for arranging the one or more cooling fins on the second surface.

In a preferred embodiment, the tube portion is a cylindrical portion, and the maximum width corresponds with the diameter thereof. However, in other embodiments the tube portion may have an inner surface, seen in a cross section perpendicular to the longitudinal direction, having substantially any one of the following shapes: circular, a closed shape (e.g. a polygon) having at least three vertices touching a virtual inner circle, a closed shape having at least three curved or straight segments contacting a virtual inner circle. More generally any shape adapted to snugly receive in a first open end thereof a cylindrical end portion of a mounting base may be envisaged. The tube portion may have an outer surface, seen in a cross section perpendicular to the longitudinal direction, having a shape which is the same as or different from the shape of the inner surface. More generally, the outer surface may have any shape.

In a preferred embodiment, the at least one cooling fin extends in the longitudinal direction. The at least one cooling fin may comprises at least one first cooling fin arranged on a first side of the tube portion and at least one second cooling fin arranged on a second side of the tube portion opposite the first side. Preferably the at least one cooling fin comprises at least three first cooling fins arranged on a first side of the tube portion and at least three second cooling fins arranged on a second side of the tube portion opposite the first side. In that manner a very good heat transport can be achieved, resulting in a good cooling of the one or more support substrates.

The at least one cooling fin may extend perpendicular on the second surface. Alternatively, the at least one cooling fin may extend under an angle with respect to the second surface, said angle being between 45° and 90°.

In a preferred embodiment, the tube portion has a second open end which is closed by a removable closure. At least one connector such as an electrical connector may be attached to the removable closure. In that manner no extra room needs to be provided in the metal body for connectors. More generally any required components may be arranged in the tube portion such that they are at the same time protected as well as easily accessible.

According to an exemplary embodiment, the removable closure comprises an attaching means configured for attaching at least one electrical or mechanical or optical component, e.g. an electrical connector, a sensor, an electrical circuit such as a driving means, etc., such that the at least one electrical or mechanical or optical component is arranged within the tube portion.

In this manner, the at least one electrical or mechanical or optical component may be easily accessed by removing the removable closure. More in particular, the need to provide attachment structures to an inner surface of the tube portion is avoided or reduced, which improves fabrication of the luminaire head.

Additionally, since the at least electrical or mechanical or optical component may be attached to the removable closure via an attaching means, replacing or changing the at least electrical or mechanical or optical component can be done easily. Thus, maintenance and upgradability of the luminaire head is facilitated.

When the at least one electrical or mechanical or optical component comprises a connector, the connector may be used to connect one or more electrical components of the luminaire head. For example, the connector may be used to connect an electrical cable, e.g. an electrical cable connected to the mains and passing from the pole into the tube portion, to one or more electrical lines connected to a PCB which is arranged on the first surface of the plate like portion. Those one or more electrical lines may pass through one or more through-holes extending between the inside of the tube portion and the first surface of the plate-like portion. In another example, the connector may be used to connect a terminal of a first component, e.g. a controller to a terminal of another component, e.g. a driver.

When the at least one electrical or mechanical or optical component comprises a driver, the driver may have input terminals connected to an electrical cable coming from the mains, on the one hand, and output terminals connected to one or more electrical components of the luminaire head, on the other hand. For example, the driver may be connected to a PCB which is arranged on the first surface of the plate like portion, in order to provide power to components arranged on the PCB, such as the light emitting elements or a sensor or more generally any other component which needs to be powered. To that end one or more electrical lines may extend from the output terminals of the driver through one or more through-holes extending from the inside of the tube portion to the first surface of the plate-like portion, to the PCB.

When the at least one electrical or mechanical or optical component comprises a cable retainer, the cable retainer may be used to fix an electrical cable, e.g. the cable coming from the mains. For example, the electrical cable may be connected directly or indirectly to a PCB with the light emitting elements, which is arranged on the first surface of the plate like portion. To that end one or more electrical lines may extend through one or more through-holes extending from the inside of the tube portion to the first surface of the plate-like portion, to the PCB.

In another embodiment, there may be provided a connector inside the tube portion, which allows connection between an electrical or mechanical or optical component attached to the removable closure and another component, e.g. a component located on the plate like portion, e.g. the light emitting elements and/or a sensor and/or a communication module, etc. To that end one or more electrical lines may extend from the connector through one or more through-holes in the metal body to the other component arranged on the first surface of the plate like portion.

The attaching means allowing the at least one electrical or mechanical or optical component to be attached to the removable closure may be a connector plate. Optionally, the connector plate may be provided with a cable retainer, e.g. to fix the electrical cable connected to the mains, to the connector plate. In another exemplary embodiment, the attaching means may comprise a slot provided to the removable closure and a support substrate, e.g. a PCB, and the support substrate may be inserted in the slot provided to the removable closure.

According to a preferred embodiment, the removable closure is a cap configured for closing off substantially fully the second open end. Preferably, the cap and/or the tube portion is provided with a sealing means, e.g. a gasket, such that the cap can be coupled to the tube portion in a sealed manner.

In this way, the removable closure may serve a double function of protection and connection. The cap may protect the elements arranged within the inner part of the tube portion from undesired foreign elements, e.g. debris, moisture. At the same time, the surface of the cap facing the inner part of the tube portion may be configured for being attached to the at least one electrical or mechanical or optical component and for supporting the at least one electrical or mechanical or optical component within the inner part of the tube portion.

In a preferred embodiment, the at least one support substrate corresponds with at least one PCB, more preferably a so-called AC PCB configured to convert an AC voltage or current into a DC current for driving the plurality of light emitting elements. By using one or more AC PCBs there is no need to use a separate driver.

In a preferred embodiment, at least one lens plate may be arranged over the at least one support substrate, wherein preferably at least one gasket is inserted between the at least one lens plate and the at least one support substrate. The plurality of light emitting elements comprises at least six, preferably at least eight light emitting elements. The at least one lens plate may comprise a plurality of lens elements, wherein the plurality of lens elements comprises at least six, preferably at least eight lens elements, more preferably at least twelve lens elements. Such arrangements are especially useful in outdoor luminaires.

In the context of the invention, a lens element may include any transmissive optical element that focuses or disperses light by means of refraction. It may also include any one of the following: a reflective portion, a backlight portion, a prismatic portion, a collimator portion, a diffusor portion. For example, a lens element may have a lens portion with a concave or convex surface facing a light source, or more generally a lens portion with a flat or curved surface facing the light source, and a collimator portion integrally formed with said lens portion, said collimator portion being configured for collimating light transmitted through said lens portion. Also, a lens element may be provided with a reflective portion or surface or with a diffusive portion.

In an exemplary embodiment, the luminaire head may comprises a cover, e.g. above the metal body of the luminaire head for esthetical purposes. The cover may be in any suitable material, e.g. plastic or metal. The cover may be a perforated cover. The cover may have any particular shape or texture. In case of a metallic cover, it may be arranged to be in contact with the at least one cooling fin to improve head dissipation. The cover may be fixed to the plate like portion in any known manner, e.g. using screws, a clamping mechanism, etc.

According to another exemplary embodiment the tube portion has a cross section with at least two flat outer surfaces including the first flat surface and a further flat surface. The tube portion may have an inner surface as defined above, e.g. an inner surface in the form of circle such that the tube portion is adapted for receiving a cylindrical end portion. The first flat surface may be part of the plate like portion, and the further flat surface may be part of a further plate like portion. A first support substrate with light emitting elements may be arranged against the first surface, and a further support substrate with light emitting elements or another component may be arranged against the further surface. At least one of the plate like portion and the further plate like portion may be provided with cooling fins extending adjacent to the tube portion. More in particular, one or more cooling fins may extend on the second surface of the plate like portion and/or on a further second surface of the further plate like portion. Optionally, one or more cooling fins may extend on the first surface of the plate like portion and/or on the further surface of the further plate like portion.

It is noted that in all embodiments disclosed above, the cooling fins may extend anywhere on the plate like portion. More in particular, they may be arranged on one side of the tube portion or on two sides of the tube portion. Further the tube portion may be arranged anywhere on the plate like portion and does not have to be arranged in the middle of the plate like portion.

According to another aspect of the invention there is provided a luminaire assembly comprising a luminaire head according to any one of the previous embodiments, and a mounting base having a cylindrical end portion, wherein said cylindrical end portion is arranged in the first end of the tube portion and fixed to the tube portion using a fixation means which extends through the hole in the tube portion.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
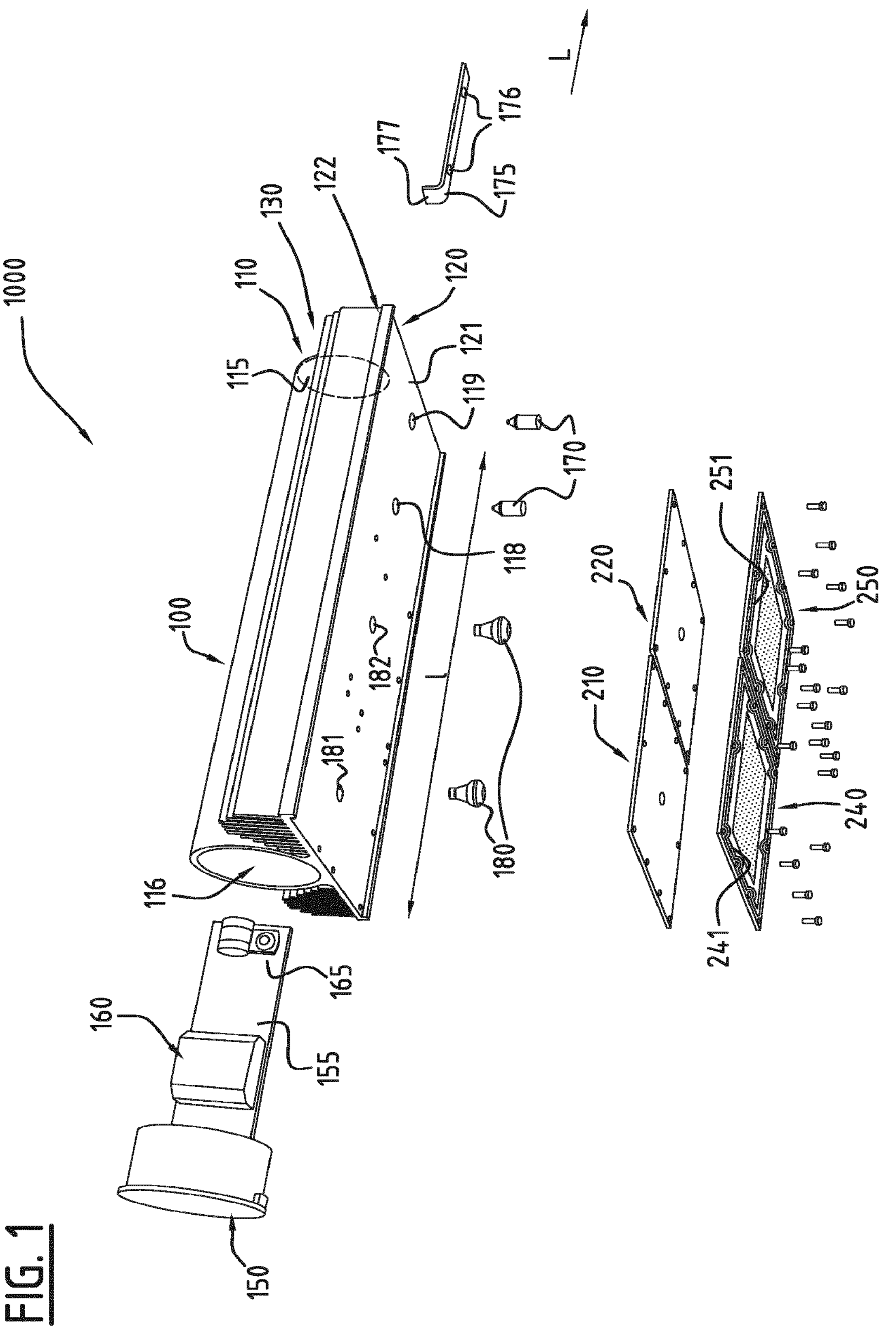
FIG. 1 illustrates schematically an exploded perspective view of a first exemplary embodiment of a luminaire head according to the invention.

FIGS. 1-4 illustrate a first exemplary embodiment of a luminaire head. The luminaire head comprises a thermally conductive metal body 100, a first and second support substrate 210, 220 with a plurality of light emitting elements 230 and electronic circuits 235, a first and a second lens plate 240, 250, and a cap 150 with a connector plate 155.

The thermally conductive metal body 100 comprises a plate like portion 120, a tube portion 110 and at least one cooling fin 130. The plate like portion 120 extends in a longitudinal direction L of the metal body 100 and has a flat first surface 121 and a second surface 122 opposite said first surface. The tube portion 110 extends in the longitudinal direction L at said second surface 122. A plurality of cooling fins 130 extend away from the second surface 122 adjacent to the tube portion 110, here at both sides of the tube portion 110. Preferably, the flat first surface 121 extends over a length 1 in the longitudinal direction L of the metal body 100, and the tube portion 110 extends over substantially the same length 1 seen in the longitudinal direction L. Preferably, the metal body 100 is an extruded body extruded in one piece in the longitudinal direction L. Preferably, the metal body 100 is made from aluminium. The metal body 100 may be anodized to improve the corrosion resistance.

The first surface 121 functions as a mounting surface for the first and second support substrate 210, 220. The first and second support substrate 210, 220 are arranged against the first surface 121, at least in an area opposite the tube portion 110, see FIG. 2. Preferably, the first and second support substrate 210, 220 each extend over a width perpendicular to the longitudinal direction L which is at least 80%, more preferably at least 90% of the width w of the plate like portion 120, and even more preferably over substantially the entire width w of the second surface 121 of the plate like portion 120, see FIG. 4. As illustrated, the first and second support substrate 210, 220 may be arranged next to each other, seen in the longitudinal direction L. It is noted that in other embodiments there may be provided a single support substrate or more than two support substrates, depending on e.g. the length 1 of the metal body and the required application. Also, it is possible to arrange two or more support substrates next to each other seen in the width direction perpendicular on the longitudinal direction L.

Preferably, the tube portion 110 extends substantially in the middle of the second surface 122 of the plate like portion 120. In other words, the first surface 121 functions as a mounting surface for the substrates 210, 200 with the light emitting elements 230, whilst the tube portion 120 is provided at the opposite second surface 122 of the plate like portion 120. The tube portion 120 may be directly connected to the second surface 122, as illustrated, or may be connected through a flange part (not illustrated) with the plate like portion 120. In that manner not only the plurality of cooling fins 130 transport heat away from the plate like portion 120, but also the tube portion 110 itself can conduct heat away from the plate like portion 120.

Generally, the luminaire head, when mounted to a support, is oriented substantially parallel respective to the surface to be illuminated. As a result, the first surface 121 may face downwardly towards the surface to be illuminated, and the plurality of cooling fins 130 may extend upwardly, away from the second surface 122.

Figure 2:
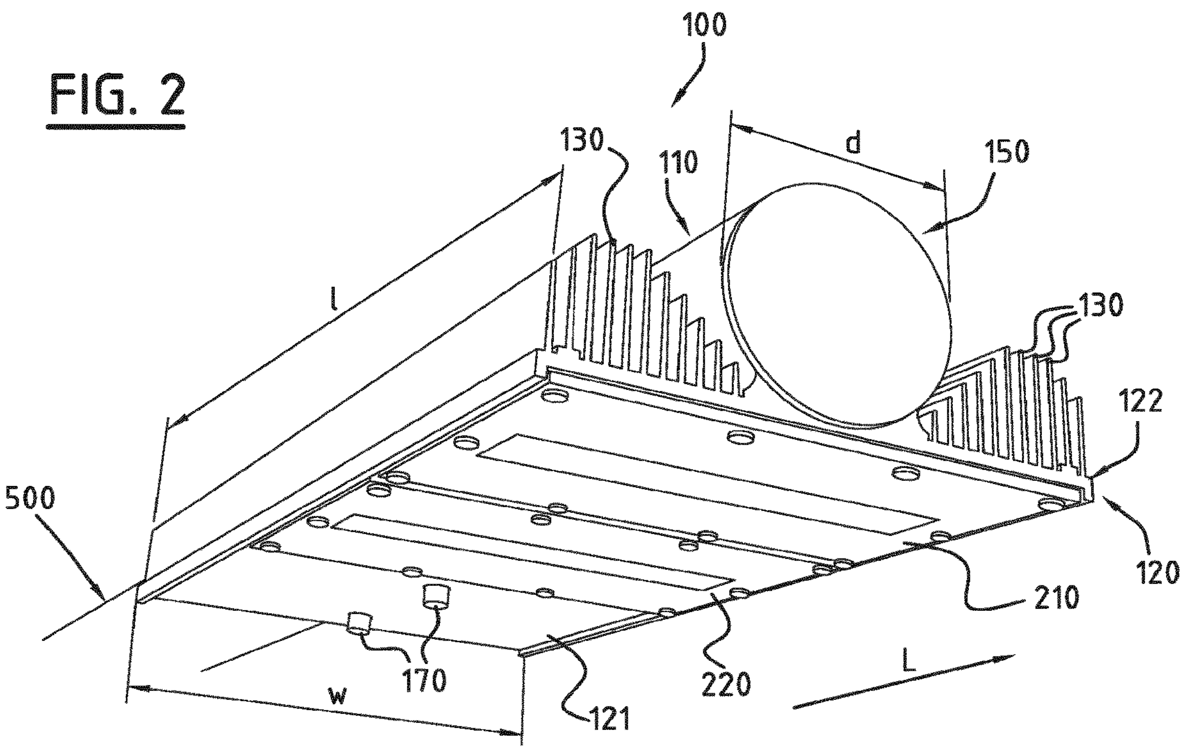
FIG. 2 illustrates schematically a perspective view of the first exemplary embodiment in the assembled state, in a bottom view.

Preferably, the width w of the plate like portion 120, seen in a width direction perpendicular on the longitudinal direction L, is at least 50% larger than a maximum width d of the tube portion 110, preferably at least twice the width d of the tube portion 110, see FIG. 2. In the illustrated embodiment the tube portion 110 is a cylindrical portion, and the maximum width d corresponds with the diameter thereof. More generally, the inner surface 111 of the tube portion 110, seen in a cross section perpendicular on the longitudinal direction L, may have substantially any one of the following shapes: circular (as in FIGS. 1-4, 6 and 8), a polygon or closed shape having at least three vertices touching a virtual inner circle (as in FIG. 5), a closed shape having at least three curved or straight segments contacting a virtual inner circle (as in FIG. 7). The maximum width d may be e.g. between 50 and 100 mm. The width w may be e.g. between 75 mm and 500 mm, more preferably between 90 mm and 300 mm. The length 1 may be e.g. between 75 mm and 1000 mm, preferably between 75 mm and 600 mm.

Preferably, the plurality of cooling fins 130 extends in the longitudinal direction L, allowing the cooling fins 130 to be extruded integrally with the other parts of the metal body 100. Preferably the plurality of cooling fins 130 comprises at least three first cooling fins 130 arranged on a first side of the tube portion 110 and at least three second cooling fins 130 arranged on a second side of the tube portion 110 opposite the first side. In the illustrated exemplary embodiment of FIGS. 1-4, eleven cooling fins 130 are provided on either side of the tube portion 110. Preferably, the plurality of cooling fins extends perpendicular on the second surface 122. Alternatively, the plurality of cooling fins 130 extends under an angle with respect to the second surface, said angle being between 45° and 90°.

Figure 3:
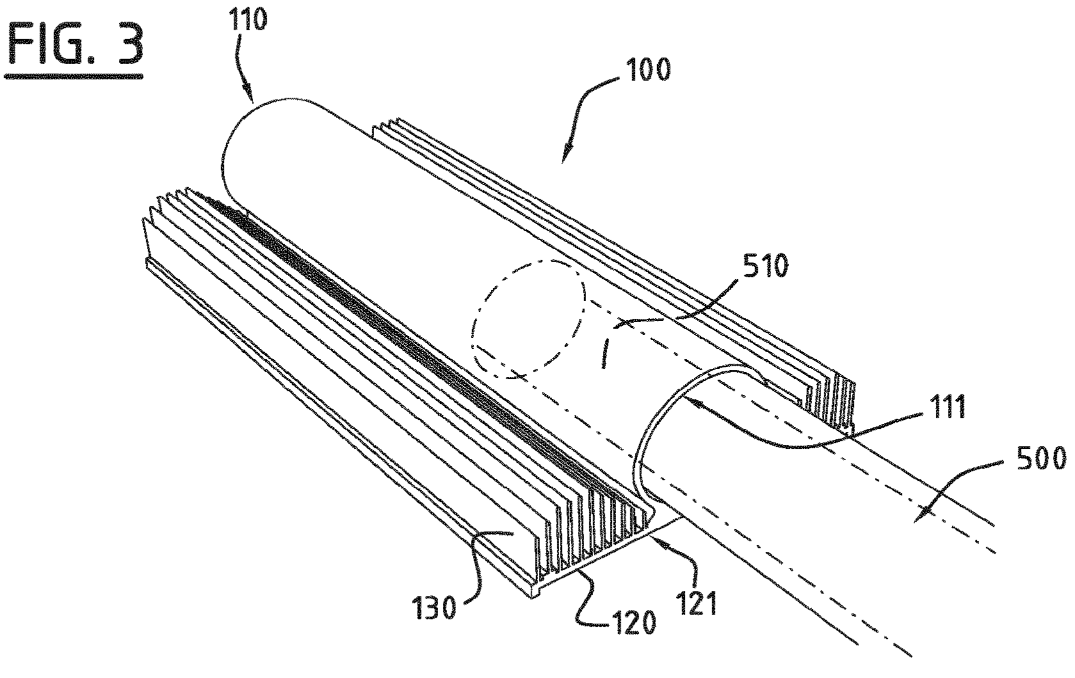
FIG. 3 illustrates schematically a perspective view of the first exemplary embodiment in the assembled state, in a top view.
Figure 4:
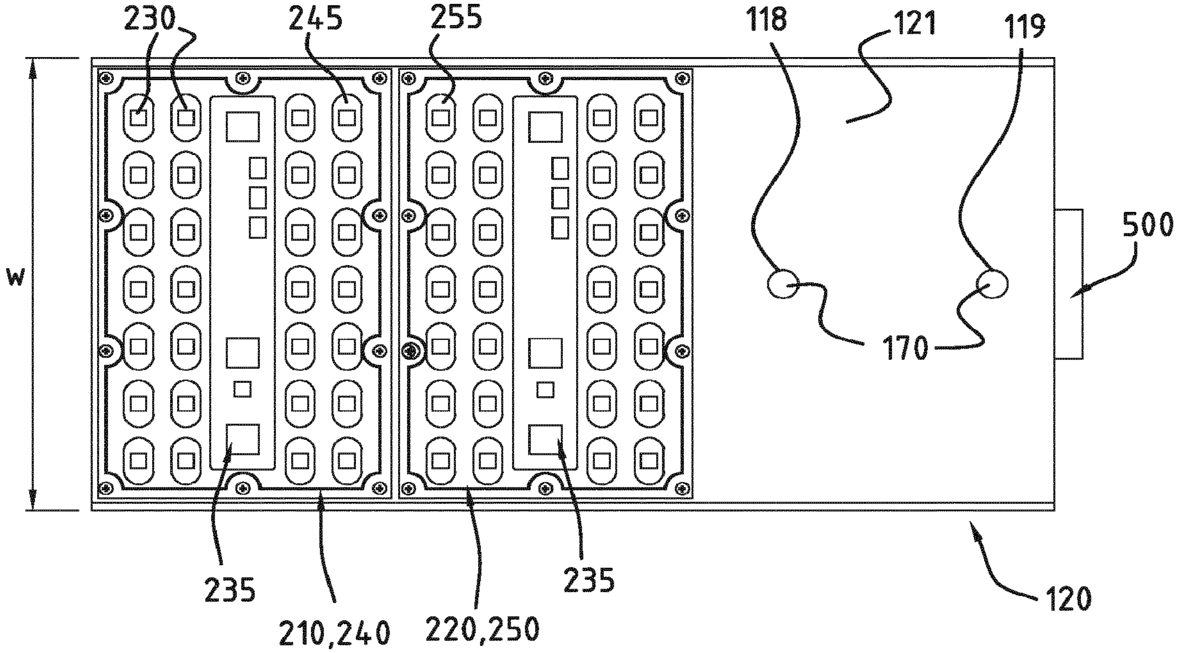
FIG. 4 illustrates schematically a bottom view of the first exemplary embodiment in the assembled state.

The tube portion 110 is shaped to receive in a first open end 115 thereof a rigid cylindrical end portion 510 of a mounting base 500, such as a pole for the luminaire head, see FIG. 3. The tube portion 110 is provided with at least one hole 118, 119 for receiving a fixation means 170, 175 to fix the tube portion 110 to the cylindrical end portion 510 of the mounting base 500. In the illustrated embodiment the fixation means 170, 175 comprises a fixation clamp 175 with two bore holes for receiving two matching screws 170, e.g. grub screws, see FIG. 1 and FIG. 2. The fixation clamp is arranged inside the tube portion 110 and receives end portions of the screws 170 which extend through holes 118, 119. Preferably, the holes 118, 119 are arranged in a portion of the metal body where the tube portion 110 joins the plate like portion. Further, the fixation clamp 175 is provided with an upwardly extending part 177 forming a stop for an end portion of the mounting base. The skilled person understands that instead of two screws 170 also one or more than two screws may be used, and that instead of a fixation clamp 175 also other fixation means may be provided for receiving the one or more screws, e.g. one or more nuts.

The tube portion 110 has a second open end 116 which is closed by a removable closure 150, here in the form of a cap. The removable closure 150 is provided with an attaching means, here a connector plate 155 extending inwardly in the tube portion 110. The connector plate 155 is provided with one or more connectors 160 and with a cable retainer 165. More generally any components useful for connecting the plurality of light emitting elements 230 or any other device located on the plate like portion (e.g. a sensor, a communication module) may be provided on the connector plate 155. In that way those components are easily accessible since the removable closure 150 with connector plate 155 can be removed from the tube portion 110.

More generally, the removable closure may comprise any attaching means configured for attaching at least one electrical or mechanical or optical component, e.g. the connector 160, a sensor, an electrical circuit such as a driving means, etc., such that the at least one electrical or mechanical or optical component is arranged within the tube portion 110.

When the at least one electrical or mechanical or optical component comprises the connector 160, the connector 160 may be used to connect one or more electrical components of the luminaire head. For example, the connector 160 may be used to connect an electrical cable, e.g. an electrical cable connected to the mains and passing from the pole into the tube portion 110, to one or more electrical connection lines connected to the support substrate, typically PCB's, 210, 220 which are arranged on the first surface 121 of the plate like portion 120. Those one or more electrical lines may be connected via one or more through-holes 181, 182 extending from the first surface 121 of the plate-like portion 120 into the tube portion 110. Optionally, a wire or cable guide 180 may be provided in each through-hole for guiding the electrical lines in a sealed manner through the through-holes 181, 182. In another example, the connector 160 may be used to connect a terminal of a first component arranged in the tube portion 110, e.g. a controller to a terminal of another component arranged in the tube portion 110, e.g. a driver.

When the at least one electrical or mechanical or optical component comprises a driver, the driver may have input terminals connected to an electrical cable coming from the mains, on the one hand, and output terminals connected to one or more electrical components of the luminaire head, on the other hand. For example, the driver may be connected to a PCB 210, 220 which is arranged on the first surface 121 of the plate like portion 120, in order to provide power to components arranged on the PCB 210, 220, such as the light emitting elements or a sensor or more generally any other component which needs to be powered. To that end one or more through-holes 181, 182 may be provided in the metal body between the first surface 121 of the plate-like portion 120 and the inner part of the tube portion 110.

The at least one electrical or mechanical or optical component attached to the removable closure 150 may be easily accessed by removing the removable closure 150. The need for additional mounting structures within the inner part of the tube portion 110 is reduced, which improves the ease of fabrication of the luminaire head. Additionally, since the at least one electrical or mechanical or optical component may be adapted to be attached to the removable closure 150 only via the attaching means 155, replacing or changing the one or more electrical or mechanical or optical component can be done easily without the need to modify the rest of the luminaire head. In another exemplary embodiment, the attaching means 155 may be a slot receiving a support substrate, e.g. a PCB, mounted therein.

The removable closure 150 is a cap in the exemplary embodiment of FIG. 1 which may be configured for closing off substantially fully the second open end, preferably in a sealed manner.

The cap 150 may protect the elements arranged within the inner part of the tube portion 110 from undesired foreign elements, e.g. debris, moisture. At the same time, the surface of the cap 150 facing the inner part of the tube portion 110 may be configured for being attached to the one or more electrical or mechanical or optical components and for supporting and holding the one or more electrical or mechanical or optical component within the inner part of the tube portion 110.

The first and second support substrate 210, 220 may be printed circuit boards. In a preferred embodiment the printed circuit boards are so-called AC PCBs comprising circuitry that is able to convert an AC current or line voltage into a DC current, allowing therefore to eliminate the use of a driver.

As illustrated, there may be provided a first and a second lens plate 240, 250 which are arranged over the first and the second support substrate 210, 220 using gaskets 241, 251, preferably in order to obtain an IP66 rating of the luminaire head. Each lens plate 240, 250 may be provided with a plurality of lens elements 245, 255 corresponding with the plurality of light elements 230.

Preferably, the plurality of light emitting elements 230 of each support substrate 210, 220 comprises at least six light emitting elements 230, more preferably at least eight light emitting elements 230. In the illustrated embodiment each support substrate 210, 220 is provided with twenty-eight light emitting elements 230 and a corresponding number of lens elements 245, 255.

Using an embodiment as illustrated in FIGS. 1-4 various advantages are obtained:

- There is provided a simple, robust, low cost luminaire head 1000 with a limited number of components and a simple pole fixation;
- The luminaire head 1000 can be easily produced in large quantities with a low level of investment.
- The metal body 100 of the luminaire head functions as heatsink, pole fixation, mounting means for optical and electrical components.
- By using AC PCBs 210, 220 there is no need to use a separate driver.
- The luminaire head is modular: the metal body 100 can be cut at the required length 1 depending on the required use.
- The luminaire head is quick and easy to assemble.
- The luminaire head has a high degree of recyclability.

Figure 5:
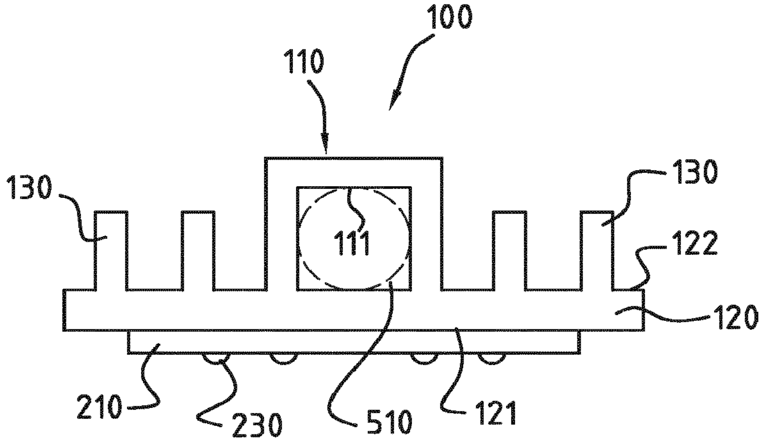
FIGS. 5-8 illustrate schematic cross sections of other exemplary embodiments of a luminaire head according to the invention.

FIG. 5 illustrates another exemplary embodiment of a luminaire head. The same or similar components have been indicated with the same reference numerals. In the embodiment of FIG. 5, the tube portion 110 has a square cross section with a square inner surface 111 adapted for receiving a cylindrical end portion 510. The other illustrated components are similar to the ones described above and therefore a detailed description thereof is omitted.

Figure 6:
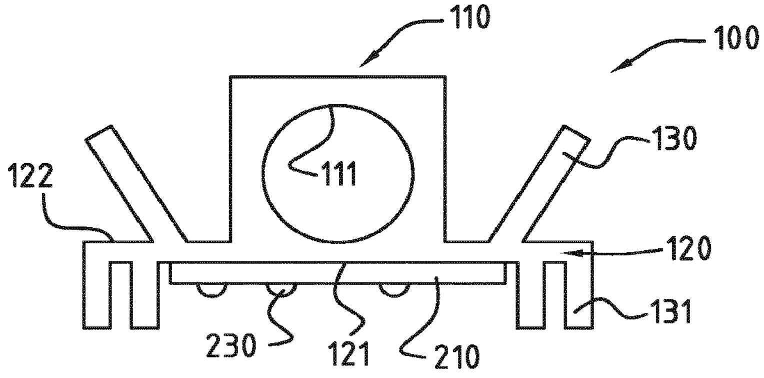

FIG. 6 illustrates another exemplary embodiment of a luminaire head. The same or similar components have been indicated with the same reference numerals. In the embodiment of FIG. 6, the tube portion 110 has a cross section with a square outer surface and a round inner surface 111 adapted for receiving a cylindrical end portion 510. Further, the cooling fins 130 are slightly inclined with respect to the second surface 122, and not perpendicular on the second surface 122. Also additional cooling fins 131 are provided on the first surface 121 of the plate like portion 120, on either side of the support substrate 210. The other illustrated components are similar to the ones described above and therefore a detailed description thereof is omitted.

Figure 7:
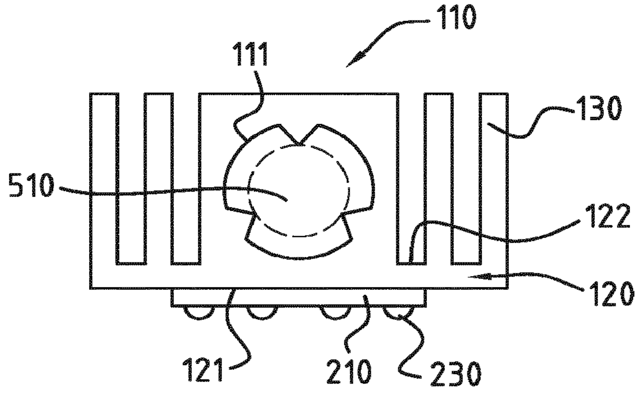

FIG. 7 illustrates another exemplary embodiment of a luminaire head. The same or similar components have been indicated with the same reference numerals. In the embodiment of FIG. 7, the tube portion 110 has a cross section with a square outer surface and an inner surface 111 in the form of a closed shape having three vertices touching a virtual inner circle such that the tube portion 110 is adapted for receiving a cylindrical end portion 510. The other illustrated components are similar to the ones described above and therefore a detailed description thereof is omitted.

Figure 8:
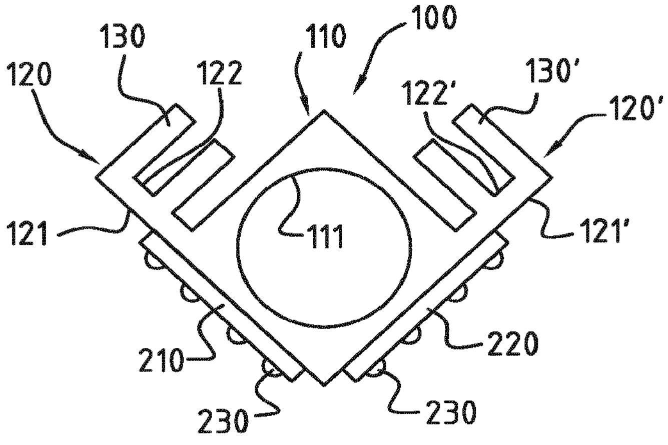

FIG. 8 illustrates yet another exemplary embodiment of a luminaire head. The same or similar components have been indicated with the same reference numerals. In the embodiment of FIG. 8, the tube portion 110 has a cross section with a square outer surface and an inner surface 111 in the form of circle such that the tube portion 110 is adapted for receiving a cylindrical end portion 510. In this embodiment two plate like portions 120, 120' are provided each having a flat first mounting surface 121, 121' and an opposite second surface 122, 122' on which cooling fins 130, 130' are arranged adjacent to the tube portion 110. A first support substrate 210 with light emitting elements 230 is arranged against the first surface 121, and a second support substrate 220 with light emitting elements 230 is arranged against the first surface 121'. The other illustrated components are similar to the ones described above and therefore a detailed description thereof is omitted.

Whilst the principles of the invention have been set out above in connection with specific embodiments, it is to be understood that this description is merely made by way of example and not as a limitation of the scope of protection which is determined by the appended claims.

The invention claimed is:

1. A luminaire head comprising:

a thermally conductive metal body comprising a first plate-like portion, a second plate-like portion, a tube portion, and at least one cooling fin for each of the first plate-like portion and the second plate-like portion, each of said first plate-like portion and second plate-like portion extending in a longitudinal direction of the metal body, the first plate-like portion having a flat first surface and a second surface opposite said first surface and the second plate-like portion having a flat further first surface and a further second surface opposite said further first surface, said tube portion extending in said longitudinal direction at said second surface and said further second surface of the first and second plate-like portions, respectively, said at least one cooling fin of the first plate-like portion and said at least one cooling fin of the second plate-like portion extending away from said second surface and said further second surface of the first and second plate-like portions, respectively, adjacent to the tube portion;

a first support substrate with a first plurality of light emitting elements, said first support substrate being arranged against the first surface of the first plate-like portion; and a second support substrate with a second plurality of light emitting elements, said second support substrate being arranged against the further first surface of the second plate-like portion, at least in an area opposite the tube portion, wherein the first support substrate and the second support substrate are arranged on the first surface of the first plate-like portion and on the further first surface of the second plate-like portion, respectively, such that the first support substrate is at an angle with respect to the second support substrate.

2. The luminaire head according to claim 1, wherein the metal body is an extruded body extruded in one piece in the longitudinal direction.

3. A luminaire head comprising:

a thermally conductive metal body comprising a plate-like portion, a tube portion, and at least one cooling fin, said plate-like portion extending in a longitudinal direction L of the metal body and having a flat first surface and a second surface opposite said first surface, said tube portion extending in said longitudinal direction at said second surface, said at least one cooling fin extending away from said second surface adjacent to the tube portion; and at least one support substrate with a plurality of light emitting elements, said at least one support substrate being arranged against the first surface, wherein the tube portion is shaped to receive in a first open end thereof a rigid cylindrical end portion of a mounting base, such as a pole for the luminaire head, wherein an inner surface of the tube portion as seen in a cross section perpendicular to the longitudinal direction has a closed shape dissimilar to an outer shape of the rigid cylindrical end portion of the mounting base, and wherein the closed shape has at least three vertices touching a virtual inner circle such as to allow only a linear contact between the at least three vertices and the outer surface of the rigid cylindrical end portion of the mounting base.

4. The luminaire head according to claim 3, wherein the tube portion is provided with at least one hole for receiving a fixation means to fix the tube portion to the cylindrical end portion of the mounting base.

5. The luminaire head according to claim 3, wherein the flat first surface extends over a length in the longitudinal direction L of the metal body, and the tube portion extends over substantially the same length L in said longitudinal direction.

6. The luminaire head according to claim 3, wherein the metal body is an extruded body extruded in one piece in the longitudinal direction, preferably an extruded body extruded from aluminium.

7. The luminaire head according to claim 3, wherein the width of the plate-like portion, seen in a width direction perpendicular on the longitudinal direction, is at least 50% larger than a maximum width of the tube portion, preferably at least twice the width of the tube portion.

8. The luminaire head according to claim 3, wherein the at least one cooling fin extends in the longitudinal direction.

9. The luminaire head according to claim 3, wherein the at least one cooling fin comprises at least three first cooling fins arranged on a first side of the tube portion and at least three second cooling fins arranged on a second side of the tube portion opposite the first side.

10. The luminaire head according to claim 3, wherein the tube portion has a second open end that is closed by a removable closure, and wherein preferably the removable closure is a cap configured for closing off substantially fully the second open end.

11. The luminaire head according to claim 10, wherein at least one connector is attached to the removable closure.

12. The luminaire head according to claim 10, wherein the removable closure comprises an attaching means configured for attaching at least one electrical or mechanical or optical component, such that the at least one electrical or mechanical or optical component is arranged within the tube portion.

13. The luminaire head according to claim 3, wherein at least one lens plate is arranged over the at least one support substrate, said at least one lens plate preferably comprising a plurality of lens elements, more preferably comprising at least six lens elements.

* * * * *